US010462116B1

(12) United States Patent
Sharifi Mehr et al.

(10) Patent No.: US 10,462,116 B1
(45) Date of Patent: Oct. 29, 2019

(54) DETECTION OF DATA EXFILTRATION

(71) Applicant: Amazon Technologies, Inc., Seattle, WA (US)

(72) Inventors: Nima Sharifi Mehr, Vancouver (CA); Darren Ernest Canavor, Redmond, WA (US); Jesper Mikael Johansson, Redmond, WA (US); Jon Arron McClintock, Seattle, WA (US); Muhammad Wasiq, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/855,298

(22) Filed: Sep. 15, 2015

(51) Int. Cl.
*H04L 29/06* (2006.01)

(52) U.S. Cl.
CPC .......... *H04L 63/062* (2013.01); *H04L 63/168* (2013.01)

(58) Field of Classification Search
CPC ..... H04L 63/062; H04L 63/168; H04L 63/10; G06F 17/30867; G06F 17/30893; G06F 17/30991; G06F 21/6245; G06F 17/30864; G16H 10/60; G06Q 30/0601; G06Q 40/04
See application file for complete search history.

(56) References Cited

U.S. PATENT DOCUMENTS

| 8,131,281 B1 * | 3/2012 | Hildner | H04L 41/0806 455/418 |
| 8,599,788 B2 * | 12/2013 | Song | H04L 63/0272 370/328 |
| 8,954,728 B1 * | 2/2015 | Juels | H04L 63/08 713/155 |
| 10,091,222 B1 * | 10/2018 | Langton | H04L 63/1425 |
| 2005/0055399 A1 * | 3/2005 | Savchuk | H04L 63/0245 709/203 |
| 2009/0271847 A1 * | 10/2009 | Karjala | H04L 63/0807 726/6 |
| 2011/0047627 A1 * | 2/2011 | Sheymov | H04L 63/1425 726/26 |

(Continued)

OTHER PUBLICATIONS

Postel, J., "User Datagram Protocol," Request for Comments 768, ISI, Aug. 28, 1980), 5 pages.

(Continued)

*Primary Examiner* — Techane Gergiso
(74) *Attorney, Agent, or Firm* — Davis Wright Tremaine LLP

(57) ABSTRACT

The present document describes systems and methods that detect unauthorized transmission of data from internal networks to remote service providers, even when the transmission occurs over an encrypted connection. An exfiltration monitor is configured to monitor encrypted communications between clients within an internal network and a remote service provider. In various implementations, the exfiltration monitor associates the encrypted connections with account information, and applies exfiltration policies to the connections based at least in part on the associated account information. In additional implementations, the exfiltration monitor is provided with cryptographic keys that facilitate packet inspection of the encrypted connections. In many situations, the exfiltration monitor can use this information to discern between authorized use of a remote service, and unauthorized data exfiltration to the remote service.

27 Claims, 12 Drawing Sheets

(56) References Cited

U.S. PATENT DOCUMENTS

| | | | | |
|---|---|---|---|---|
| 2011/0238855 | A1* | 9/2011 | Korsunsky | G06F 21/55 709/231 |
| 2012/0084866 | A1* | 4/2012 | Stolfo | G06F 21/554 726/25 |
| 2013/0019309 | A1* | 1/2013 | Strayer | G06N 5/04 726/23 |
| 2013/0024942 | A1* | 1/2013 | Wiegenstein | G06F 11/3604 726/25 |
| 2013/0067552 | A1* | 3/2013 | Hawkes | H04L 63/166 726/7 |
| 2013/0263226 | A1* | 10/2013 | Sudia | H04L 63/1466 726/4 |
| 2013/0333037 | A1* | 12/2013 | Bowen | G06F 21/566 726/23 |
| 2013/0347085 | A1* | 12/2013 | Hawthorn | H04L 63/0823 726/6 |
| 2014/0073291 | A1* | 3/2014 | Hildner | H04L 41/0806 455/411 |
| 2014/0115702 | A1* | 4/2014 | Li | G06F 11/30 726/23 |
| 2014/0157405 | A1* | 6/2014 | Joll | H04L 63/1425 726/22 |
| 2014/0283004 | A1* | 9/2014 | Moore | H04L 63/0263 726/13 |
| 2015/0163121 | A1* | 6/2015 | Mahaffey | G06F 11/0766 707/687 |
| 2015/0271207 | A1* | 9/2015 | Jaiswal | H04L 63/20 726/1 |
| 2015/0355957 | A1* | 12/2015 | Steiner | G06F 11/0772 714/37 |
| 2016/0072709 | A1* | 3/2016 | Moore | H04L 63/0263 370/392 |
| 2016/0099852 | A1* | 4/2016 | Cook | H04L 47/2425 709/224 |
| 2016/0127395 | A1* | 5/2016 | Underwood | H04L 63/1416 726/23 |
| 2016/0277360 | A1* | 9/2016 | Dwyier | H04L 63/0227 |
| 2016/0308895 | A1* | 10/2016 | Kotler | H04L 63/1433 |
| 2017/0063896 | A1* | 3/2017 | Muddu | H04L 63/1425 |

OTHER PUBLICATIONS

Postel, J., "Transmission Control Protocol, DARPA Internet Program Protocol Specification," Information Science Institute University of Southern California, Request for Comments 793, Sep. 1981, 161 pages.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Dierks, T., et al., "The TLS Protocol Version 1.0," Request for Comments: 2246, Standards Track, Jan. 1999, 75 pages.

Kent, S., "Security Architecture for the Internet Protocol," Request for Comments: 2401, Standards Track, Nov. 1998, 62 pages.

Orman, H., "The Oakley Key Determination Protocol," Request for Comments: 2412, Informational, Nov. 1998, 56 pages.

Newman, C., "Using TLS with IMAP, POP3 and ACAP," Request for Comments: 2595, Standards Track, Jun. 1999, 16 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of SEED Cipher Suites to Transport Layer Security (TLS)," Request for Comments: 4162, Standards Track, Aug. 2005, 7 pages.

Ford-Hutchinson, P., "Securing FTP with TLS," Request for Comments: 4217, Standards Track, Oct. 2005, 29 pages.

Lehtinen, S., and C. Lonvick, "The Secure Shell (SSH) Protocol Assigned Numbers," Request for Comments: 4250, Standards Track, Jan. 2006, 19 pages.

Ylonen, T., and C. Lonvick, "The Secure Shell (SSH) Protocol Architecture," Request for Comments: 4251, Standards Track, Jan. 2006, 28 pages.

Ylonen, T., and C. Lonvick, "The Secure Shell (SSH) Authentication Protocol," Request for Comments: 4252, Standards Track, Jan. 2006, 16 pages.

Ylonen, T., and C. Lonvick, "The Secure Shell (SSH) Transport Layer Protocol," Request for Comments: 4253, Standards Track, Jan. 2006, 30 pages.

Ylonen, T., and C. Lonvick, "The Secure Shell (SSH) Connection Protocol," Request for Comments: 4254, Standards Track, Jan. 2006, 23 pages.

Schlyter, J., and W. Griffin, "Using DNS to Securely Publish Secure Shell (SSH) Key Fingerprints," Request for Comments: 4255, Standards Track, Jan. 2006, 9 pages.

Cusack, F., and M. Forssen, "Generic Message Exchange Authentication for the Secure Shell Protocol (SSH)," Request for Comments: 4256, Standards Track, Jan. 2006, 12 pages.

Eronen, P., and H. Tschofenig, "Pre-Shared Key Ciphersuites for Transport Layer Security (TLS)," Request for Comments: 4279, Standards Track, Dec. 2005, 16 pages.

Kent, S., and K. Seo, "Security Architecture for the Internet Protocol," Request for Comments: 4301, Standards Track, Dec. 2005, 102 pages.

Kent, S., "IP Encapsulating Security Payload (ESP)," Request for Comments: 4303, Standards Track, Dec. 2005, 45 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Galbraith, J., and P. Remaker, "The Secure Shell (SSH) Session Channel Break Extension," Request for Comments: 4335, Standards Track, Jan. 2006, 6 pages.

Bellare, M., et al., "The Secure Shell (SSH) Transport Layer Encryption Modes," Request for Comments: 4344, Standards Track, Jan. 2006, 12 pages.

Harris, B., "Improved Arcfour Modes for the Secure Shell (SSH) Transport Layer Protocol," Request for Comments: 4345, Standards Track, Jan. 2006, 5 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

(56) References Cited

OTHER PUBLICATIONS

Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with Null Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.
Rescorla, E., et al., "Transport Layer Security (TLS) Renegotiation Indication Extension," Request for Comments: 5746, Standards Track, Feb. 2010, 16 pages.

Mcgrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Igoe, K., and D. Stebila, "X.509v3 Certificates for Secure Shell Authentication," Request for Comments: 6187, Standards Track, Mar. 2011, 17 pages.
Kim, W., et al., "Addition of the ARIA Cipher Suites to Transport Layer Security (TLS)," Request for Comments: 6209, Informational, Apr. 2011, 10 pages.
Igoe, K., "Suite B Cryptographic Suites for Secure Shell (SSH)," Request for Comments: 6239, Informational, May 2011, 15 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
McGrew, D., and D. Bailey, "AES-CCM Cipher Suites for Transport Layer Security (TLS)," Request for Comments: 6655, Standards Track, Jul. 2012, 8 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

* cited by examiner

DETECTION OF DATA EXFILTRATION

BACKGROUND

Many businesses have adopted the use of remote services such as Internet-based backup, storage, and computing services as a way to fulfil their growing need for computing resources. As the use of remote and online services has increased, certain security risks have become a growing concern. One problem of particular concern is data exfiltration. Data exfiltration is the unauthorized transfer of data from a computer system, network, or secure domain. Conventional data exfiltration detection systems often detect and limit the unauthorized transfer of data. Some data exfiltration detection systems accomplish this by detecting when a large amount of data is transmitted from within a client's internal network, to an unknown or abnormal destination outside the client's internal network. For example, a data exfiltration detection system can raise an alarm as a result of detecting 2 TB of data sent off to an Internet-based file sharing site, even if the data is encrypted in transit. The combination of a high data volume and the use of an unknown/abnormal destination triggers the alarm.

BRIEF DESCRIPTION OF THE DRAWINGS

Various embodiments in accordance with the present disclosure will be described with reference to the drawings, in which.

DETAILED DESCRIPTION

Figure 1:
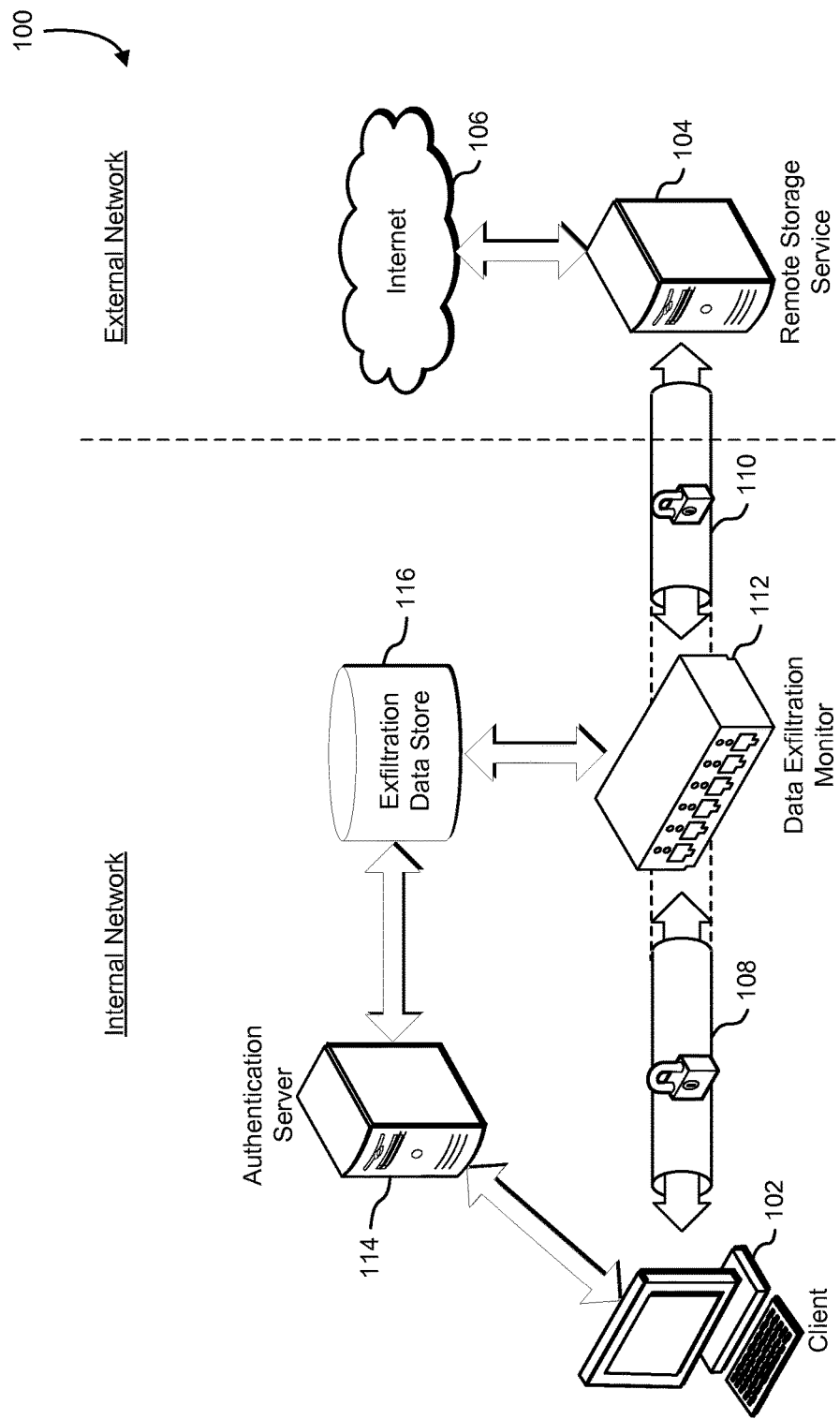
FIG. 1 shows an illustrative example of an environment in which various embodiments may be practiced.

The current document describes systems and methods that detect and limit data exfiltration by providing exfiltration monitoring systems with information regarding secure connections. In some situations, certain data exfiltration monitoring systems are unable to detect data exfiltration when an attacker uses an online storage service as an intermediary to transfer the data. For example, if an organization uses a particular remote storage service in their usual course of business, an unauthorized transfer of a large amount of data from within the business's internal network to the particular remote storage service might not be detected because large authorized transfers of data to the particular remote storage service are performed during the usual course of business. An attacker, using a different account with the particular remote storage service can, in some situations, upload large amounts of data to the particular remote storage service without being detected. Detecting the exfiltration can be more difficult when the upload occurs using a secure protocol such as TLS, since the use of the secure protocol may defeat packet inspection and/or obscure the identity of the attacker.

Detection of data exfiltration to a remote storage service over a secure network connection can be facilitated by providing, to an exfiltration monitoring system, information that identifies the account of the remote storage service associated with the secure network connection. The exfiltration monitoring system acts as a man-in-the-middle, monitoring connections between clients within an internal network and external remote services. For example, when an attacker uses a Secure Sockets Layer ("SSL") or a Transport Layer Security ("TLS") connection to transfer data from within a company network to an outside remote storage service, an account ID can be exchanged by the client and the remote storage service as part of the SSL/TLS handshake process. The account ID can be provided in plaintext or in an encrypted format that is decryptable by the exfiltration monitoring system. The exfiltration monitoring system intercepts this information and associates the SSL/TLS connection with the indicated remote storage service account. If the attacker attempts to transfer large amounts of data to the remote storage server using an account not associated with the company, the exfiltration monitoring system can detect the large data transfer and raise an alarm. The account information can be provided to the exfiltration monitor by the client, the storage service, or both the client and the storage service. In some implementations, the account information is exchanged during the SSL/TLS handshake. In other implementations, the account information can be provided outside the handshake process, or using a separate network connection from the client or server, to the exfiltration monitor.

The exfiltration monitor can register the transmission of data to and from remote services, and associate the registered activity with the intercepted account information, even when the transmission occurs using a secure protocol such as TLS. The exfiltration monitor records the registered activity in a database of exfiltration data. The database can be used to record information regarding connections to the remote service such as the amount of data transmitted over the connection, a service account associated with the connection, and cryptographic keys used to secure the connection. The database can also contain a set of exfiltration policies that indicate, for a particular account, restrictions on the amount of data that is allowed to be exchanged with the service. For example, clients from within the company network may use the company's account for an online storage service in order to access company information, but may not use their own personal account with the same online storage service from within the company network. The amount of permitted data exfiltration can be a fixed value, or a periodic quota that regenerates over time. When the exfiltration monitor detects that an exfiltration policy is violated, the exfiltration monitor can log the violation, terminate network connections associated with a particular account, send alerts to system administrators, or otherwise cause access to the remote service to be terminated.

Account information provided to an exfiltration monitor can be verified in a number of ways. The account information intercepted by the exfiltration monitor can be verified by the remote storage service. In one example, when the remote storage service receives the account information in the TLS handshake, the remote storage service verifies that the resources accessed are associated with the account identified in the TLS handshake. In another example, the remote storage service verifies that the account information provided to the service using the service's normal authentication channel matches the account information provided in the TLS handshake. When the remote storage service determines that the account information provided in the TLS handshake is not valid, access to the remote storage service can be terminated by terminating the secure network connection, canceling the account used to access the remote storage service, sending an alert to the exfiltration monitor, or a combination of these actions.

In some versions, the exfiltration monitor confirms the actions of a client against service logs provided by a remote storage service. When the client connects to the remote storage service, the client provides account information to the exfiltration monitor within the TLS handshake. The exfiltration monitor associates the secure network connection with the account information provided by the client, and monitors the volume of client activity that occurs over the resulting TLS connection. By accessing logs provided by the remote storage service, the exfiltration monitor confirms that the amount of logged service activity that is associated with the account information provided by the client, matches the amount of registered activity over the TLS connection. If the amount of activity registered does not match the amount of activity logged, the exfiltration monitor determines that the account information provided by the client in the TLS handshake is incorrect. If the account information provided by the client is determined to be incorrect, the exfiltration monitor takes corrective action such as terminating the connection to the remote storage service, terminating access to the remote storage service, or sending an alarm to a system administrator.

Packet inspection can be facilitated by providing an exfiltration monitor with cryptographic keys that allow the exfiltration monitor to inspect the contents of a secure channel. Cryptographic keys may be provided to the exfiltration monitor during negotiation of the secure channel, or after the secure channel is established. In one example, TLS session keys are encrypted with a cryptographic key known to the exfiltration monitor, and embedded in an extended TLS handshake. In another example, information identifying an exfiltration monitor is exchanged in an extended TLS handshake. Once the connection is established, either the client or the server establishes a secure connection with the exfiltration monitor and provides the TLS session keys. By making the TLS session keys accessible to the exfiltration monitor, the exfiltration monitor is able to decrypt and inspect the contents of communications between the client and the remote storage service, even when those communications occur over the secure channel. If neither the client nor the server provides the cryptographic keys of the secure channel to the exfiltration monitor, the exfiltration monitor can terminate the connection, send an alert to a system administrator, or otherwise restrict access to the remote storage service over the connection.

FIG. 1 shows an illustrative example of an environment in which various embodiments may be practiced. An environment 100 includes a client 102 in communication with a remote storage service 104. The remote storage service 104 is hosted on an external network that is connected to the Internet 106. The remote storage service 104 can be a publicly available storage service such as an FTP server, web-based storage service, file upload service, file sharing site, file sharing service, peer-to-peer file sharing system, or other remote service. In some environments, other types of remote services are used in place of the remote storage service 104. The client 102 communicates with the remote storage service 104 using an encrypted communication channel. The encrypted communication channel is divided into a first segment 108 and a second segment 110 by a data exfiltration monitor 112. The data exfiltration monitor 112 can be implemented on a network appliance such as a network router, switch, hub, or firewall. In some embodiments, the data exfiltration monitor 112 is implemented on a general purpose computer within the internal network. In yet another embodiment, the data exfiltration monitor 112 is implemented within the remote storage service 104. If the data exfiltration monitor 112 is implemented within the remote storage service 104, the operator of the remote storage service may offer data exfiltration monitoring as an additional service to corporate clients of the remote storage service. In yet another embodiment, the data exfiltration monitor is implemented on the client 102. The data exfiltration monitor 112 acts as a man-in-the-middle, intercepting and monitoring communications between clients located within the internal network and remote services located within the external network.

An authentication server 114 manages information relating to remote storage service accounts, clients, and exfiltration policies. The authentication server 114 can be a computer system running software that enables administrators to create and store policies that describe how the remote storage service 104 can be used. For example, the policies can specify a set of accounts on the remote storage service 104 that are used for approved business purposes. In another example, the policies specify a maximum amount of data that can be transferred to the remote storage service from a particular account without raising an exfiltration alert. Exfiltration data is maintained within an exfiltration data store 116 that is accessible to the data exfiltration monitor 112 and the authentication server 114. The exfiltration data store 116 can be maintain on a data storage device in the data exfiltration monitor 112 or the authentication server 114. In some examples, the data store is located on a storage device that is accessible via a computer network accessible to both the data exfiltration monitor 112 and the authentication server 114. The exfiltration data store 116 retains information relating to network connections between clients located within the internal network and remote services in the external network. Exfiltration policies may also be maintained in the exfiltration data store 116.

In some implementations, the data exfiltration monitor 112 is provided with remote service account information that is associated with the encrypted communication channel. In one example, the client 102 provides the account information to the data exfiltration monitor 112 as a result of negotiating the encrypted communication channel. The client 102 initiates a connection to the remote storage service 104, and transmits account information for the remote storage service as part of an initial handshake. The remote storage service 104 receives the account information in the handshake, and validates the account information against a separate account validation that occurs as part of accessing the remote storage service 104 (such as a username and password validated by the remote storage service). If the client 102 attempts to access remote storage service resources that are not associated with the account identified in the handshake, the remote storage service 104 determines that the attempted access is not authorized. If the client 102 attempts to access the remote storage service 104 with an account different than the account identified in the handshake, the remote storage service 104 determines that the attempted access is not authorized. If the remote storage service 104 determines that the attempted access is not authorized, action can be taken by the remote storage service 104 such as terminating the connection, notifying the data exfiltration monitor 112 of the unauthorized access attempt, or otherwise disabling access to the remote storage service. In another example, the client 102 requests that the remote storage service 104 provide account information to the data exfiltration monitor 112. The remote storage service 104 provides the validated account information associated with the connection to the data exfiltration monitor 112.

Communications over the encrypted communication channel are usually not decryptable by the data exfiltration monitor 112 unless the communications are part of a handshake process, or the data exfiltration monitor 112 is provided with cryptographic keys that allow the decryption of the encrypted communications. Information that is intended for the data exfiltration monitor 112 that is exchanged during the handshake process between the client 102 and the remote storage service 104 can be in plaintext form, or can be encrypted using a cryptographic key or key pair known by the data exfiltration monitor 112. In some implementations, the client 102 or the remote storage service 104 sends communications to the data exfiltration monitor 112 over a separate connection.

In another implementation, the data exfiltration monitor 112 is provided with cryptographic keys that allow the data exfiltration monitor 112 to decrypt encrypted communications between the client 102 and the remote storage service 104. The cryptographic keys can be provided by the client 102 and/or the remote storage service 104. The data exfiltration monitor 112 can register communications between the client 102 and the remote storage service 104, determine the service account associated with the connection, and identify the nature of the data being transferred. If the client 102 attempts to transfer unusual amounts of sensitive data to the remote storage service 104, the data exfiltration monitor 112 can detect the attempted data exfiltration and terminate the network connection. The data exfiltration monitor 112 can enforce a policy requiring the client 102 to provide cryptographic keys as a condition of accessing the remote storage service 104. If the client 102 does not provide the requested cryptographic keys to the data exfiltration monitor 112, the data exfiltration monitor 112 determines that the attempted connection to the remote storage service 104 is unauthorized and terminates the connection, or otherwise limits access to the remote storage service 104.

The current document describes extensions to the Transport Layer Security ("TLS") protocol that provides the data exfiltration monitor 112 with account information and/or cryptographic keys. The techniques described are applicable to other secure protocols. For example, the Internet Protocol Security ("IPSec") protocol can be similarly extended by exchanging account information between the client 102 and the remote storage service 104, or by providing appropriate cryptographic keys to the data exfiltration monitor 112.

Figure 2:
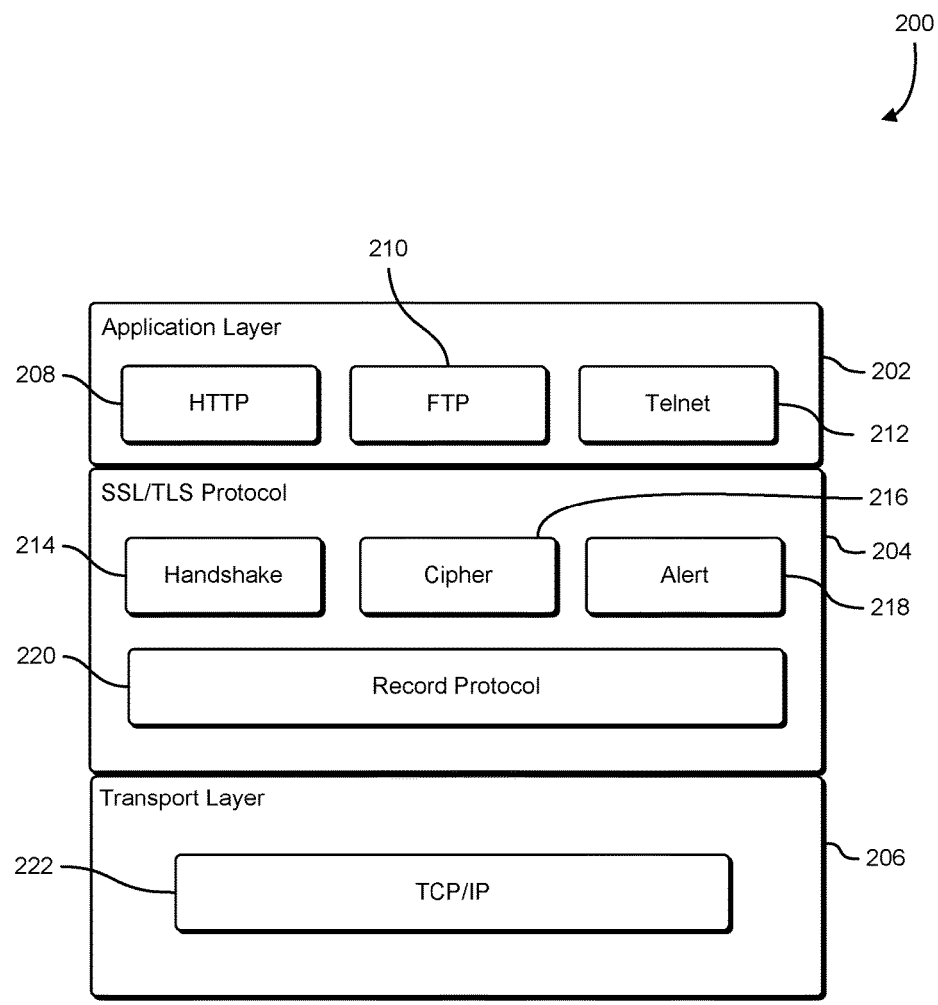
FIG. 2 shows an illustrative example of a network stack that implements the Transport Layer Security ("TLS") protocol, in accordance with an embodiment.

FIG. 2 shows an illustrative example of a network stack 200 that implements the TLS protocol, in accordance with an embodiment. TLS and SSL are protocols that are related to each other. In this document, the terms TLS, SSL, or SSL/TLS refer to any versions of SSL, TLS, or other secure protocols that negotiate operational parameters of a secure connection using a handshake, and then exchange encrypted data over the secure connection. The network stack diagram shows an application layer 202, an SSL/TLS protocol layer 204, and a transport layer 206. The application layer 202 includes a number of application protocols including an HTTP protocol 208, an FTP protocol 210, and a Telnet protocol 212. The HTTP protocol 208 utilizes the SSL/TLS protocol to implement an HTTPS protocol. The FTP protocol 210 uses the SSL/TLS protocol to create an FTPS protocol. The Telnet protocol 212 utilizes the SSL/TLS protocol to implement a Telnet-TLS protocol.

The SSL/TLS protocol layer 204 includes a handshake protocol 214, a cipher protocol 216, an alert protocol 218, and a record protocol 220. The handshake protocol 214 is used to negotiate a secure connection. The handshake protocol 214 can be used to establish a number of parameters associated with the secure connection such as a session identifier, a peer certificate, a compression method, a cipher spec, and a master secret. The cipher protocol 216 is used to communicate changes in the ciphering strategy associated with the secure connection. The alert protocol 218 is used to convey messages related to the status of the secure connection. Alert messages that convey a severity of "fatal" cause the termination of the secure connection.

The record protocol 220 receives data from higher layers and fragments the data into chunks, optionally compresses the data, applies a Message Authentication Code ("MAC"), and encrypts and transmits the resulting data. When data is received over the network, the received data is decrypted, verified using the MAC, decompressed (if necessary), defragmented, and returned to higher layers. Application data messages can be carried by the record protocol 220 and treated as transparent data to the record protocol 220.

The SSL/TLS protocol layer 204 operates on top of a transport layer 206 that implements a TCP/IP protocol 222. The TCP/IP protocol 222 provides reliable connection-oriented and datagram protocols. UDP provides a connectionless transmission service that transmits an individual packet of information between two endpoints. The transmission is unreliable, in that receipt of the transmitted packet is not confirmed automatically by the recipient. TCP provides a connection-oriented transmission service that transmits a stream of data reliably between two endpoints. The transmission is reliable, and receipt of the stream of data is confirmed by the recipient.

Additional information regarding the User Datagram Protocol ("UDP") is described in RFC 768. Additional information regarding TCP is described in RFC 793. Additional information describing the TLS protocol (Version 1.2) is contained in RFC 5246 which is incorporated herein by reference.

Figure 3:
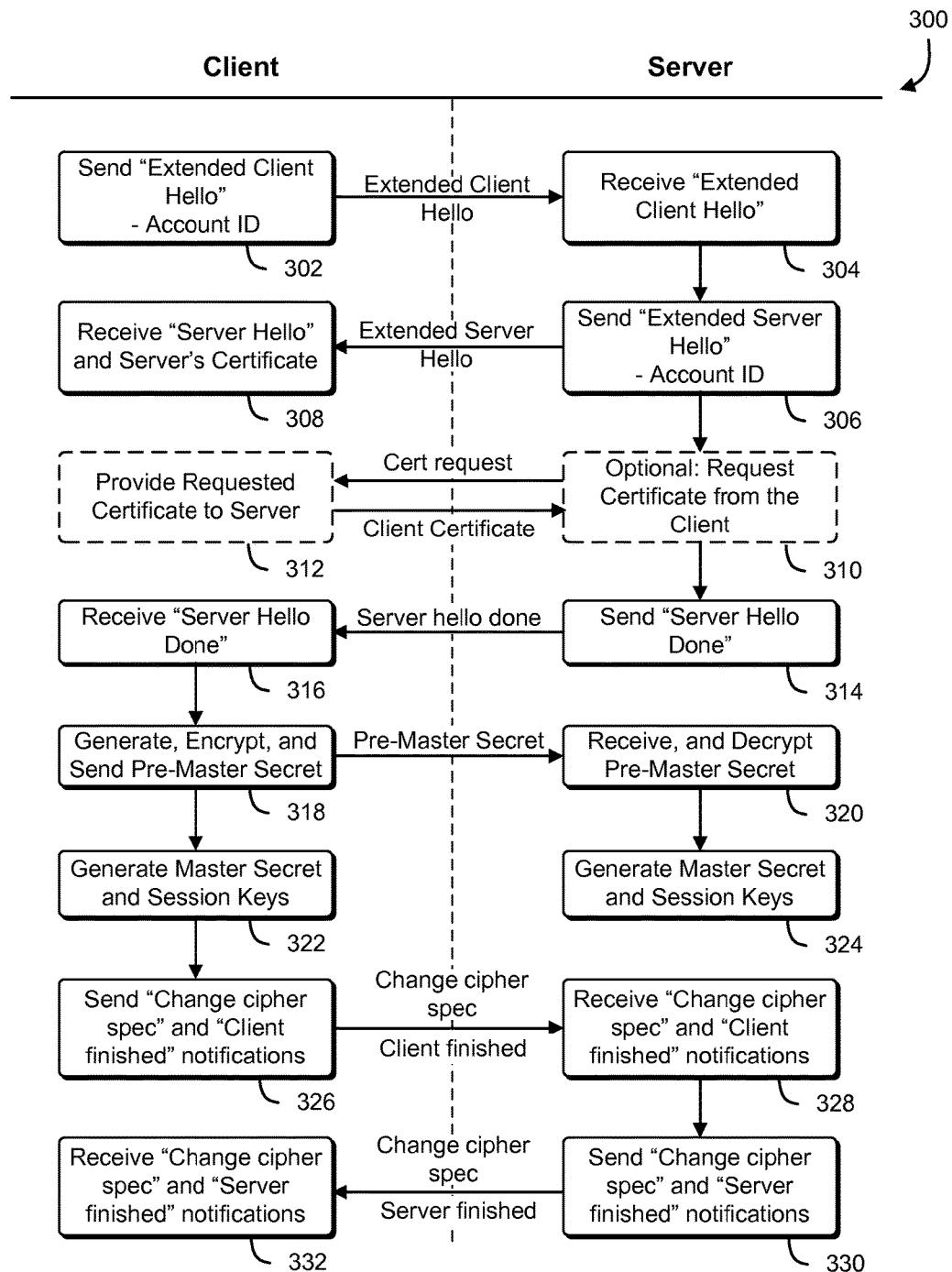
FIG. 3 shows an illustrative example of a process that, when performed by a client and a server, provides account information during a TLS handshake, in accordance with an embodiment.

FIG. 3 shows an illustrative example of a process that, when performed by a client and a server, provides account information during a TLS handshake, in accordance with an embodiment. A swim diagram 300 illustrates a process that performs an extended handshake as part of negotiating a secure connection. At block 302, the client sends an extended "Client hello" message to the server. The extended "Client hello" message includes a list of extensions, and the list of extensions includes an account ID extension. In some implementations, the client includes account information in an extension data field. The server receives 304 the extended "Client hello" message from the client, and determines whether the server will support one or more extensions specified in the extended "client hello" message. The server also determines an acceptable set of mutually supported cipher suites based at least in part on a list of cipher suites provided by the client. At block 306, the server sends an extended "Server hello" message to the client that includes a chosen cipher suite from the list of cipher suites provided by the client, the server's digital certificate, and a value that is randomly generated by the server. If the server determines to support one or more of the extensions identified in the client's extended "client hello" message, the server specifies the supported extensions in the servers extended "Server hello" message. At block 306, the server provides an extended "Server hello" message that includes an account ID extension. The client receives 308 the extended "Server hello" message from the server along with the supported extensions, the server's certificate, a randomly generated value, and a determined set of cipher suites. The client can validate the identity of the server using the server's provided certificate. The account ID information contained in the extensions can be encrypted using a cryptographic key that is accessible to a data exfiltration monitor. In some embodiments, the address information is included in the extension associated with the extended "Server hello" message, and not in the extended "client hello" message. In other embodiments, the address information is included in the extension associated with the extended "client hello" message, and not in the extended "Server hello" message.

A data exfiltration monitor can monitor the exchange of the extended "client hello" and extended "Server hello" messages and extract account information from the extension data. The data exfiltration monitor associates the connection with the account identified in the handshake, records the amount of data transferred over the connection, and associates the data transfer with the identified account. The data exfiltration monitor can apply exfiltration policies that are based at least in part on this information.

In some implementations, the client provides a digital certificate that proves the identity of the client to the server. At block 310, the server sends a request to the client for the client's digital certificate. At block 312, the client responds to the request by providing the client's digital certificate to the server. If the client does not provide the requested digital certificate, the server may respond with a fatal handshake failure alert. If the client provides a certificate that is unacceptable, for example a certificate that is not signed by a known, trusted CA, the server may send a fatal alert.

At block 314, the server sends a "Server hello done" message to the client. The client receives 316 the "Server hello done" message, and proceeds to block 318 where the client generates, encrypts and sends a pre-master secret to the server. At block 320, the server receives and decrypts the pre-master secret. Using the pre-master secret, the client generates a master secret and session keys at block 322. At block 324, the server generates a master secret and session keys. The client signals 326 to the server that the client will be switching to a secure cipher by sending a "change cipher spec" message to the server, followed by a "client finished" message. The server receives the "change cipher spec" message and the "client finished" message at block 328. At block 330, The server responds with its own "change cipher spec" message followed by a "server finished" message. The client receives the "change cipher spec" and the "server finished" message at block 332.

Once the process illustrated in the swim diagram 300 is completed, parameters of a secure communication session have been negotiated between the client and server. The client and the server can continue to transmit application data, secured by the negotiated cipher suite, using an encrypted record protocol.

Figure 4:
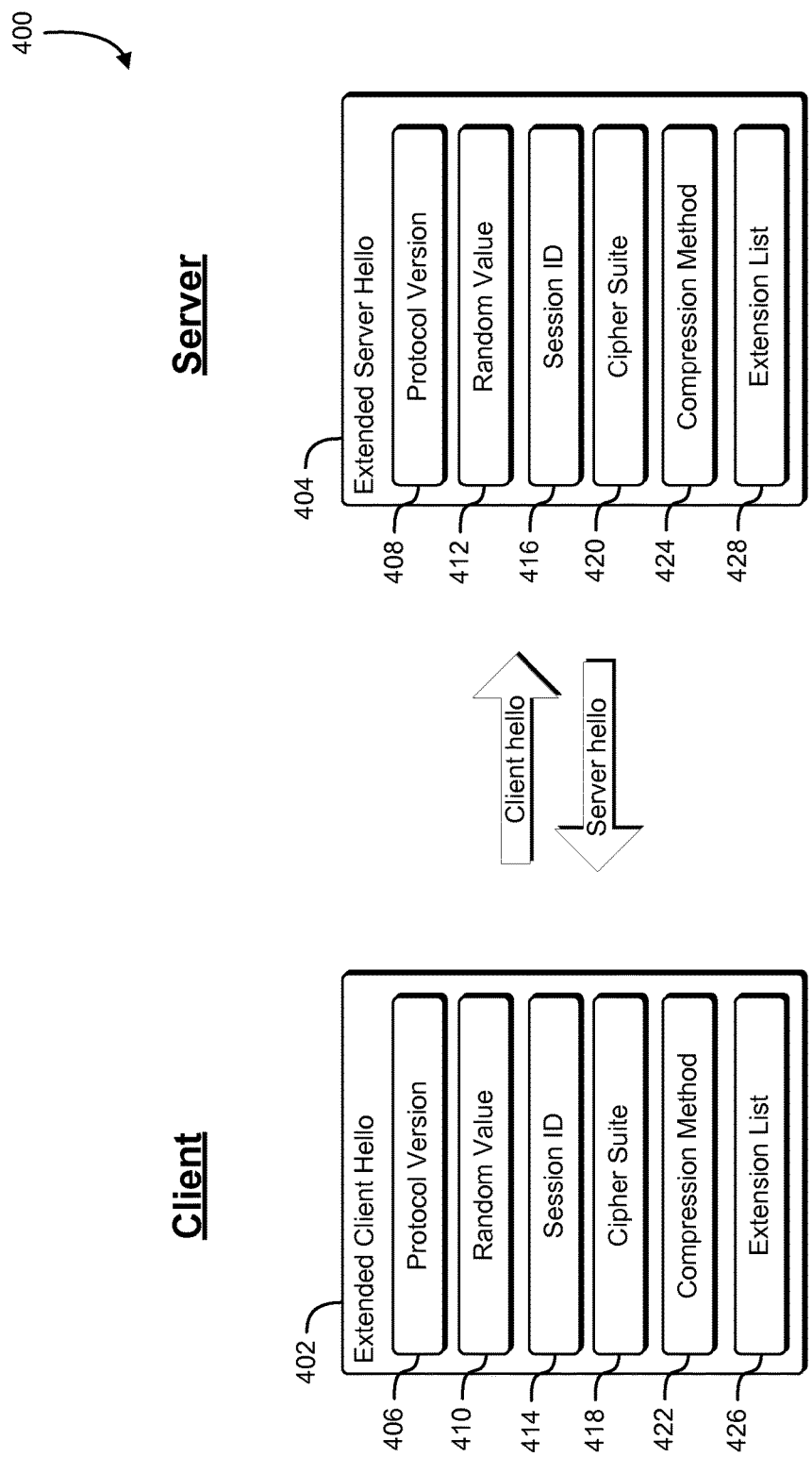
FIG. 4 shows an illustrative example of an extended "Server hello" message and an extended "Client hello" message for use with the TLS protocol, in accordance with an embodiment.

FIG. 4 shows an illustrative example of an extended "Server hello" message and an extended "Client hello" message for use with the TLS protocol, in accordance with an embodiment. A diagram 400 illustrates the structure of an extended "Client hello" message 402 and an extended "Server hello" message 404. The extended "Client hello" message 402 includes a client protocol version 406. The client protocol version 406 identifies the version of the TLS protocol that the client is requesting for a particular session.

The extended "Server hello" message 404 includes a server protocol version 408. The server protocol version 408 will contain the lower of the client protocol version 406, and the highest version supported by the server.

The extended "Client hello" message 402 includes a client random value 410 that is randomly generated by the client. The extended "Server hello" message 404 includes a server random value 412 that is independently generated from the client random value 410 by the server.

The extended "Client hello" message 402 includes a client session ID 414 that is used by the client to specify an ID for the session. The client session ID 414 may be empty if no session ID is available, or if the client wishes to generate new security parameters. The extended "Server hello" message 404 includes a server session ID 416. If the server receives a client session ID 414 that is not empty, the server will attempt to find a cached session having the client session ID 414. If a match is found, the server may respond with a server session ID 416 that is the same as the client session ID 414, indicating a resumed session. If the server session ID 416 is returned with a different value than the client session ID 414, a new session is indicated having the session ID specified by the server session ID 416.

The extended "Client hello" message 402 includes a list of cipher suites 418. The list of cipher suites 418 indicates cipher suites that are supported by the client and is provided in an order sorted to indicate the preferences of the client. The extended "Server hello" message 404 includes a server cipher suite 420. The server cipher suite 420 is a single cipher suite, selected from the list of cipher suites 418 provided by the client, and supported by the server. If a session is resumed, the server cipher suite 420 will indicate the cipher suite from the resumed session state.

The extended "Client hello" message 402 includes a list of compression methods 422. The list of compression methods 422 is provided by the client in a sorted order that indicates the preferences of the client. The extended "Server hello" message 404 includes a compression method 424, selected from the list of compression methods 422, and supported by the server. If the session is resumed, the compression method 424 is the compression method used for the resumed session.

A client may offer one or more extensions as part of the TLS hello exchange. The extended "client hello" message 402 includes a client extension list 426. The client extension list 426 indicates a set of TLS extensions supported by the client. The extended "Server hello" message 404 includes a server extension list 428. The server extension list 428 specifies extensions that are supported by the client, and that the server is willing to support. The server may not include extensions in the server extension list 428 that are not first specified in the client extension list 426. Server-initiated extensions may be supported, provided that the client first indicates that the extension type is supported in the client extension list 426. For example, a client may send an extended "Client hello," with an extension list that includes an extension of type X with an empty extension data field, to indicate to the server that extensions of type X are supported. The server may respond with an extended "Server hello" that includes an extension list with an extension of type X. If the client receives an extended "Server hello" containing an extension that was not present in the corresponding extended "Client hello," the client may terminate the connection.

Figure 5:
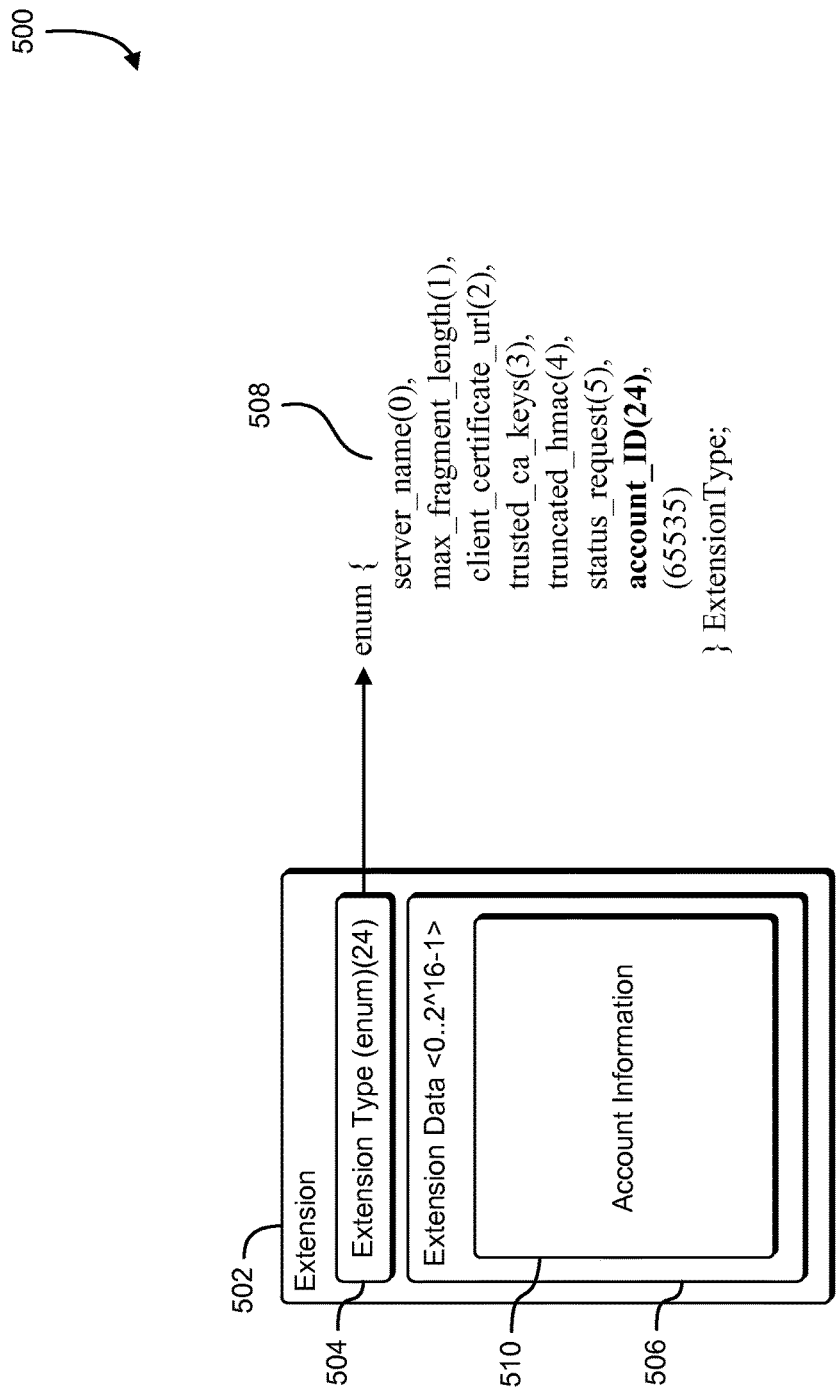
FIG. 5 shows an illustrative example of an extension record that provides account information, in accordance with an embodiment.

FIG. 5 shows an illustrative example of an extension record that provides account information, in accordance with an embodiment. A diagram 500 shows a structure of a TLS extension record 502 that includes account information. The TLS extension record 502 can be included as part of a modified TLS handshake. A data exfiltration monitor can extract data from the TLS extension record that identifies a particular service account. The TLS extension record 502 includes an extension type 504, and extension data 506. The extension type 504 is an enumeration that specifies the type of the extension. An example definition showing various types of extensions is shown in a code fragment 508. The code fragment 508 defines seven types of extensions: a server name extension, a max fragment length extension, a client certificate URL extension, a trusted CA keys extension, a truncated HMAC extension, a status request extension, and an account ID extension. Additional types of extensions can be defined by modifying the provided code fragment 508. Account information 510 is provided in the extension data 506. The account information 510 may include an account ID, an account name, a Globally Unique Identifier ("GUID") associated with the account, or other account information. In some implementations, some or all of the account information 510 is encrypted using a cryptographic key accessible to the data exfiltration monitor.

In a TLS-based implementation, the TLS extension record is transmitted in the extended "client hello" message sent to the remote service. When the remote service receives the extended "client hello" message, the server can respond with an extended "Server hello" message that also includes the TLS extension record 502. The account information 510 can be included in the extended "client hello" message, the extended "Server hello" message, or both extended "client hello" and extended "Server hello" messages.

Figure 6:
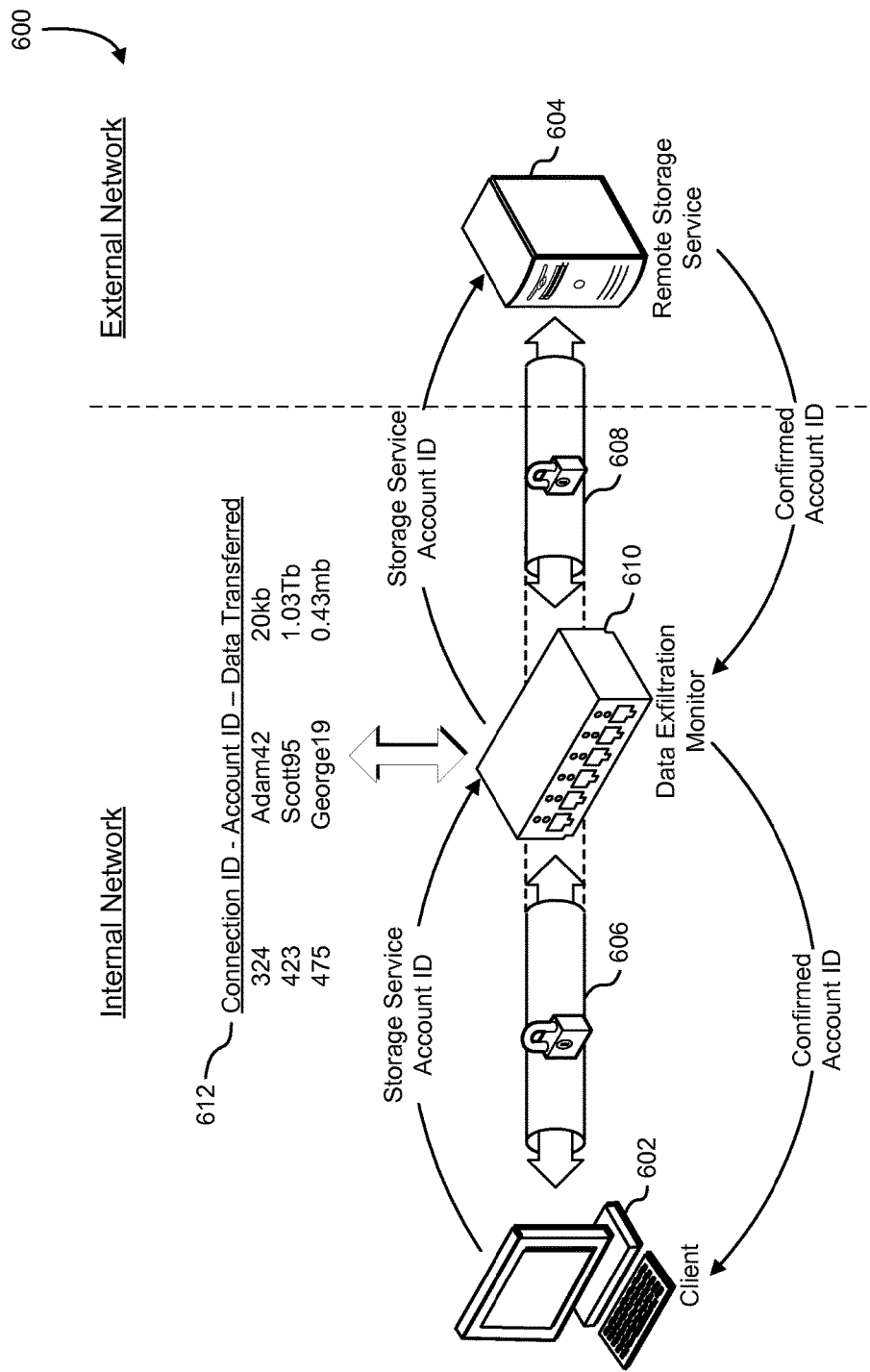
FIG. 6 shows an illustrative example of a data exfiltration monitor that associates connections with corresponding account information, in accordance with an embodiment.

FIG. 6 shows an illustrative example of a data exfiltration monitor that associates connections with corresponding account information, in accordance with an embodiment. A diagram 600 shows a system that provides account information for encrypted network connections between a client 602 within an internal network and a remote storage service 604. A secure network connection such as a TLS connection is established between the client 602 and the remote storage service 604. The secure network connection is divided into a first connection segment 606 and a second connection segment 608 by a data exfiltration monitor 610. The data exfiltration monitor 610 acts as a man-in-the-middle, monitoring communications over the secure network connection. Transmissions between the client 602 and the remote storage service 604 are encrypted, and in many situations, prevent the data exfiltration monitor 610 from inspecting the content of the transmission. Even if the data exfiltration monitor 610 cannot inspect the content of the transmission, the data exfiltration monitor 610 can estimate the amount of data transferred between the client 602 and the remote storage service 604 by examining the amount of encrypted data transferred between the client 602 and the remote storage service 604. The estimate can be adjusted based at least in part on the type of encryption used to encrypt the transmitted data, and the compression algorithm used to compress the transmitted data. In one example, when a particular amount of encrypted data is registered being transmitted between the client 602 and the remote storage service 604, the data exfiltration monitor 610 determines the encryption algorithm used to encrypt the data and applies an encryption multiplier to the particular amount of encrypted data to estimate the amount of unencrypted data transmitted between the client 602 and the remote storage service 604. If the data exfiltration monitor 610 determines that the transmitted data is compressed, the data exfiltration monitor 610 applies a compression multiplier to the estimated amount of unencrypted data transmitted between the client 602 and the remote storage service 604.

The data exfiltration monitor 610 can associate the secure network connection with an account ID of the remote storage service 604 by observing information embedded in a handshake operation that establishes the secure network connection. In one example, a TLS connection is initiated from the client 602 the remote storage service 604. The client 602 initiates a connection by sending a modified "client hello" message to the remote storage service 604. The modified "client hello" message includes an account ID that is associated with the remote storage service 604. The data exfiltration monitor 610 registers the modified "client hello" message, and associates the account ID with the connection. In some implementations, the account ID is transmitted as an extension to the TLS "client hello" message. The account ID can be encrypted using a cryptographic key that is accessible to the data exfiltration monitor 610.

As a result of receiving the modified "client hello" message from the client 602, the remote storage service 604 may confirm the provided account ID. In one implementation, the remote storage service 604 performs client-authentication operations particular to the provided service, and confirms the account ID provided in the modified "client hello" message against the account information provided as part of the client-authentication operations. For example, if the client 602 provides an account ID of "ABC," the remote storage service 604 expects the client to access the remote storage service with the "ABC" account by providing the username and password associated with the "ABC" account over the encrypted channel. If the client logs in to the remote storage service 604 service in with an account different from the account identified in the modified "client hello" message, or if the client accesses resources of the remote storage service 604 that are not associated with the account identified in the modified "client hello" message, the remote storage service 604 can take action on behalf of the data exfiltration monitor 610. The remote storage service 604 can terminate the connection, log the activity of the client 602, send an alert to the data exfiltration monitor 610 or to a system administrator, disable the remote storage service account used by the client, impose limits on the amount of data transferable by the client 602, or otherwise limit data transfer to or from the remote storage service 604.

In some implementations, the remote storage service 604 provides an account ID to the data exfiltration monitor 610 by embedding the account ID in a modified "Server hello" message. In some examples, the remote storage service 604 provides the account ID from the received modified "client hello" message in the modified "Server hello" message. In another example, the remote storage service 604 determines the account ID in the modified "Server hello" message based at least in part on account validation information exchanged between the client 602 and the remote storage service 604 over the encrypted channel. For example, if the client 602 and the remote storage service 604 exchange login and password information over the secure channel for account "XYZ," the remote storage service 604 includes the account ID "XYZ" in the modified "Server hello" message sent to the client 602 via the data exfiltration monitor 610. In some implementations, the remote storage service 604 provides the account ID to the data exfiltration monitor 610 as part of an additional record, or over a network connection separate from the secure connection between the client 602 and the remote storage service 604. The account ID provided by the remote storage service 604 can be encrypted using a cryptographic key known by the data exfiltration monitor 610.

As a result of the data exfiltration monitor 610 receiving account ID information, the data exfiltration monitor 610 can associate secure network connections between clients and the remote storage service 604, with particular service accounts. By coordinating the account ID information with the data transfer information for each connection, the data exfiltration monitor 610 can compile an exfiltration information table 612 that relates account information to an amount of data transferred. The data exfiltration monitor 610 can determine an amount of data transferred over each connection, and can aggregate a total amount of data transferred for each account ID. If an account that is not associated with authorized company use of a remote storage service shows an excessive amount of data transferred, data exfiltration may be indicated. For example, in the exfiltration information table 612 connection number 423 is accessing a service account identified by "Scott95," and a large amount of information (1.03 TB) has been transferred to the remote storage service 604. Such activity may indicate unauthorized data transfer.

If data exfiltration has been detected, the remote storage service 604 can take actions that mitigate data loss. In some examples, the remote storage service 604 is notified by the data exfiltration monitor 610 that a connection or account has been used for unauthorized data exfiltration. The remote storage service 604 quarantines the transfer data by blocking transfers of the stolen data off the remote storage service 604. The remote storage service 604 can block transfers of the stolen data by disabling the account used for data exfiltration or by blocking access to the stolen data. In some implementations, the remote storage service will permit access to the suspect account or stolen data only when the connection originates from within the internal network.

Figure 7:
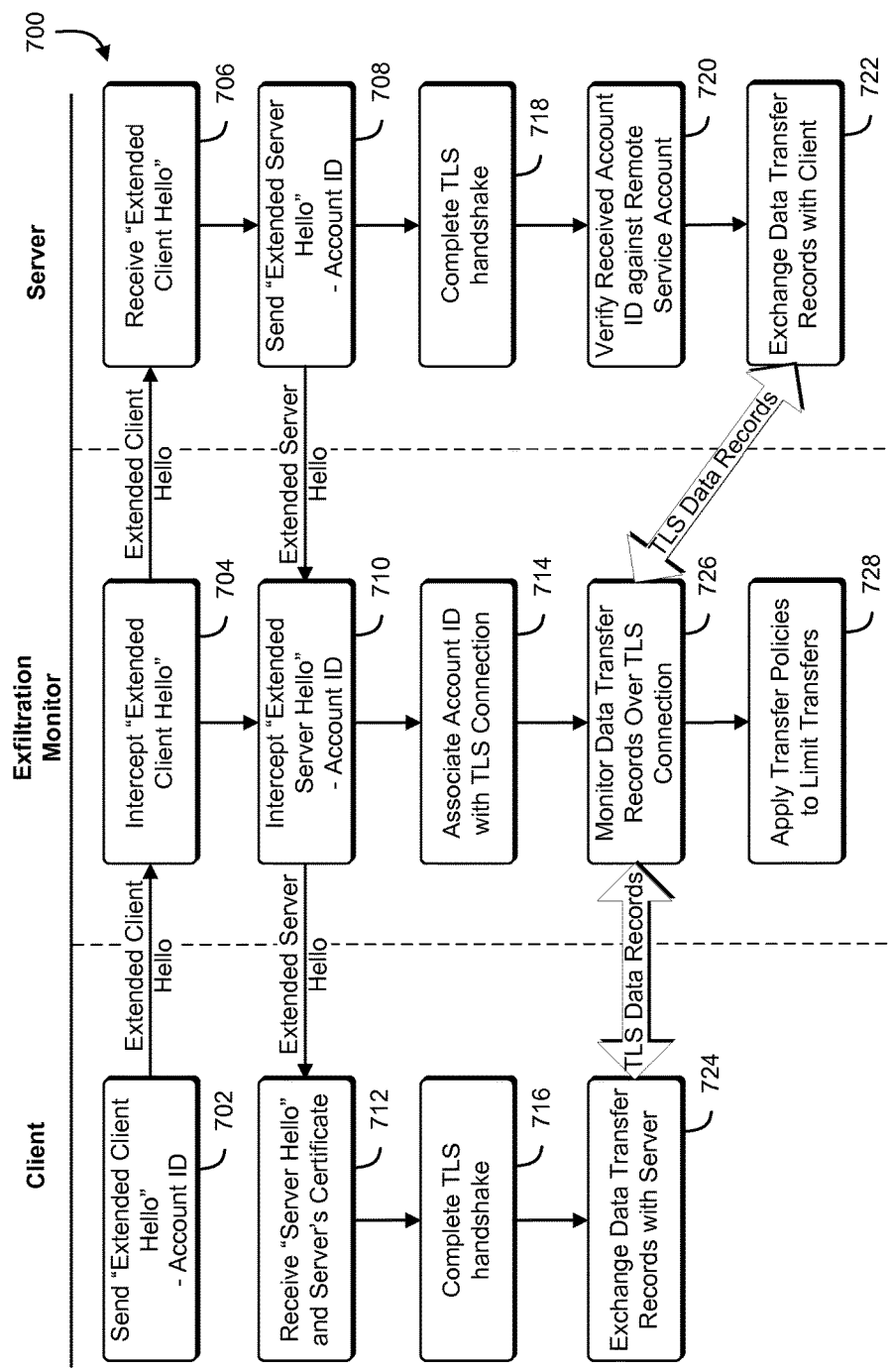
FIG. 7 shows an illustrative example of a process that, when performed by a client, a server, and an exfiltration monitor, monitors data exfiltration with account information embedded in a TLS handshake, in accordance with an embodiment.

FIG. 7 shows an illustrative example of a process that, when performed by a client, a server, and an exfiltration monitor, monitors data exfiltration with account information embedded in a TLS handshake, in accordance with an embodiment. A swim diagram 700 illustrates a process that establishes a secure session with an extended TLS handshake. The extended TLS handshake includes account information that is associated with the connection by the exfiltration monitor. The exfiltration monitor confirms the account information provided by the extended TLS handshake by comparing the account information provided by the extended TLS handshake with account information negotiated between the client and the server over the secure session. At block 702, the client sends an extended "Client hello" message to the server. The extended "Client hello" message includes an account ID extension. An extension data field can contain information that can identify an account on the server. The exfiltration monitor intercepts the extended "Client hello" message at block 704 and extracts the account information from the extension data field, if the extension data field includes account information. At block 706, the server receives the extended "Client hello" message, with the account ID extension. In some implementations, at block 708, the server confirms the account information received in the extended "Client hello" message, and responds to the client with an extended "Server hello" message that includes the confirmed account information. In another implementation, at block 708, the server acquires account information about the client and provides the account information in the extended "Server hello" message. In yet another implementation, the server does not provide account information in the extended "Server hello" message. At block 710 the exfiltration monitor intercepts the extended "Server hello" message. If the extended "Server hello" message includes account information, the exfiltration monitor extracts the account information and associates 714 the connection with the identified account. At block 712, the client receives the extended "Server hello" message, which includes the server's digital certificate. The server's digital certificate may be validated by the client to confirm the server's identity. At block 716, the client completes the TLS handshake in part by sending a change cipher spec message and a "Client finished" message to the server. At block 718, the server completes the TLS handshake by sending a change cipher spec message and a "Server finished" message to the client.

At block 720, the server verifies the account ID received in the extended "Client hello" message against account information determined as part of the client's authentication with the server's service. In one example, the server determines the account used by the client by receiving a username and password from the client over the established TLS connection. In another example, the server monitors the resources on the server that are accessed by the client, and restricts the client to resources that are accessible by both the account identified in the TLS handshake and the account identified as part of authentication with the service. In yet another example, the server verifies the account information provided by the client in the extended "Client hello" message using a digital certificate provided by the client. If the server detects that the account information provided by the client as part of the extended "Client hello" message is invalid, or if the client accesses the server in a way that is inconsistent with the account identified in the "Client hello" message (for example by changing the account used to access the service), the server can determine that the client is attempting to use a service from within an internal network against the exfiltration policies enforced within the internal network. As a result, the server can terminate the connection, disable the service account used by the client, blog the suspect activity, send an alert to the exfiltration monitor, or notify a system administrator.

At blocks 722 and 724, the server and the client use the TLS record protocol to exchange data with each other. The exfiltration monitor monitors 726 the flow of information between the server and the client and records the amount of data transferred in each direction. The exfiltration monitor determines the amount of information transferred with each service account based at least in part on the account information associated with each connection. The exfiltration monitor can apply a set of policies that specify the conditions under which a server can be accessed. For example, the exfiltration monitor can permit access to the server using only a particular set of accounts. In another example, the exfiltration monitor provides unrestricted access for a particular set of accounts, and limits access for other accounts by limiting the amount of data that can be transferred from an internal network to the service. In yet another example, the exfiltration monitor accesses a database of authorized accounts maintained by administrators of the internal network to determine the particular set of accounts that are granted unrestricted access. The exfiltration monitor applies the exfiltration policies at block 728. If the exfiltration monitor determines that the exfiltration policies have been violated, the exfiltration monitor can break the network connection between the client and server, and/or block additional requests to connect to the server that identify the offending account.

Figure 8:
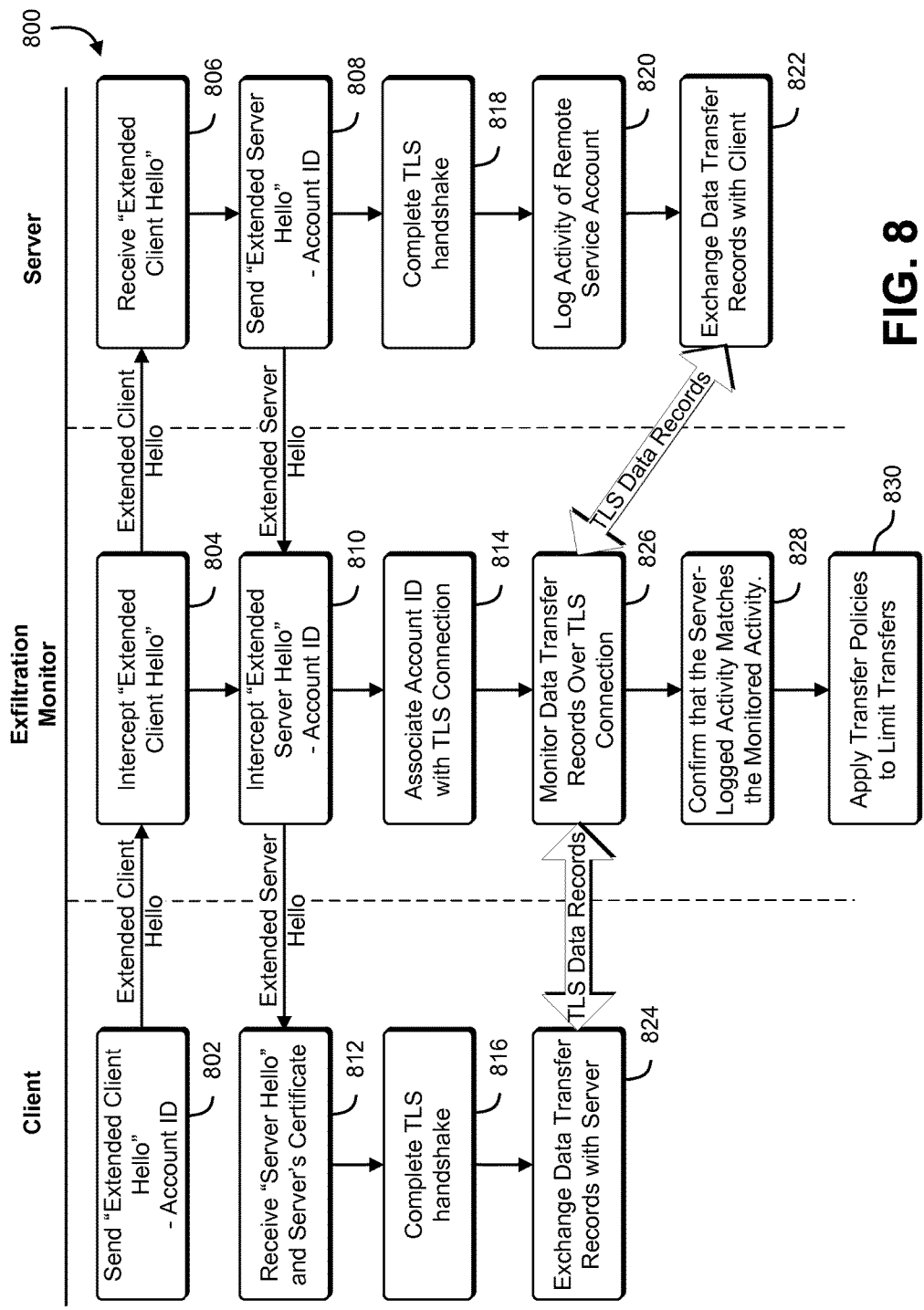
FIG. 8 shows an illustrative example of a process that, when performed by a client, a server, and an exfiltration monitor, monitors data exfiltration using activity logs on the server, in accordance with an embodiment.

FIG. 8 shows an illustrative example of a process that, when performed by a client, a server, and an exfiltration monitor, monitors data exfiltration using activity logs on the server, in accordance with an embodiment. A swim diagram 800 illustrates a process that establishes a secure session with an extended TLS handshake. The extended TLS handshake includes account information that is associated with the connection by the exfiltration monitor. The exfiltration monitor confirms the account information provided by the extended TLS handshake by comparing the account information provided by the extended TLS handshake with account information negotiated between the client and the server over the secure session. At block 802, the client sends an extended "Client hello" message to the server. The extended "Client hello" message includes an account ID extension. An extension data field can contain information that can identify an account on the server. The exfiltration monitor intercepts the extended "Client hello" message at block 804 and extracts the account information from the extension data field, if the extension data field includes account information. At block 806, the server receives the extended "Client hello" message, with the account ID extension. In some implementations, at block 808, the server confirms the account information received in the extended "Client hello" message, and responds to the client with an extended "Server hello" message that includes the confirmed account information. In another implementation, at block 808, the server acquires account information about the client and provides the account information in the extended "Server hello" message. In yet another implementation, the server does not provide account information in the extended "Server hello" message. At block 810 the exfiltration monitor intercepts the extended "Server hello" message. If the extended "Server hello" message includes account information, the exfiltration monitor extracts the account information and associates 814 the connection with the identified account. At block 812, the client receives the extended "Server hello" message, which includes the server's digital certificate. The server's digital certificate may be validated by the client to confirm the server's identity. At block 816, the client completes the TLS handshake in part by sending a change cipher spec message and a "Client finished" message to the server. At block 818, the server completes the TLS handshake by sending a change cipher spec message and a "Server finished" message to the client.

At block 820, the server logs the client activity related to the remote service account. Logs are maintained on the server, but can be accessed by the exfiltration monitor. The logs maintained by the server keep a record of an amount of data transferred to and from the server using particular accounts. At blocks 822 and 824, the server and the client use the TLS record protocol to exchange data with each other. The exfiltration monitor monitors 826 the flow of information between the server and the client and records the amount of data transferred in each direction. The exfiltration monitor determines the amount of information transferred with each service account based at least in part on the account information associated with each connection. At block 828, the exfiltration monitor verifies that the account information provided by the client to the server in the extended "Client hello" message is correct by comparing information in the logs maintained by the server to the transmissions registered and monitored by the exfiltration monitor. In one example, a client provides account information in a TLS handshake as part of an extended "Client hello" message. The exfiltration monitor intercepts the extended "Client hello" message, extracts the account information, and verifies that the data transfers registered by the exfiltration monitor correspond to data transfers logged by the server. If the client provides a false account ID in the extended "Client hello" message, and then performs a large data transfer, the exfiltration monitor will access the logs on the server and determined that the transfer registered does not match the transfer logged. Therefore, the false account ID is detected and the exfiltration monitor can terminate the connection. At block 830, the exfiltration monitor determines whether the exfiltration policies have been violated, and if the exfiltration policies have been violated, the exfiltration monitor can break the network connection between the client and server, notify the server that the connection has violated an exfiltration policy, and/or block additional requests to connect to the server that identify the offending account. In some implementations, the exfiltration monitor notifies the server if the exfiltration monitor detects unauthorized transfer of data from the internal network. As a result of receiving the notification from the exfiltration monitor, the server can restrict or block extraction of the stolen data from the server.

Figure 9:
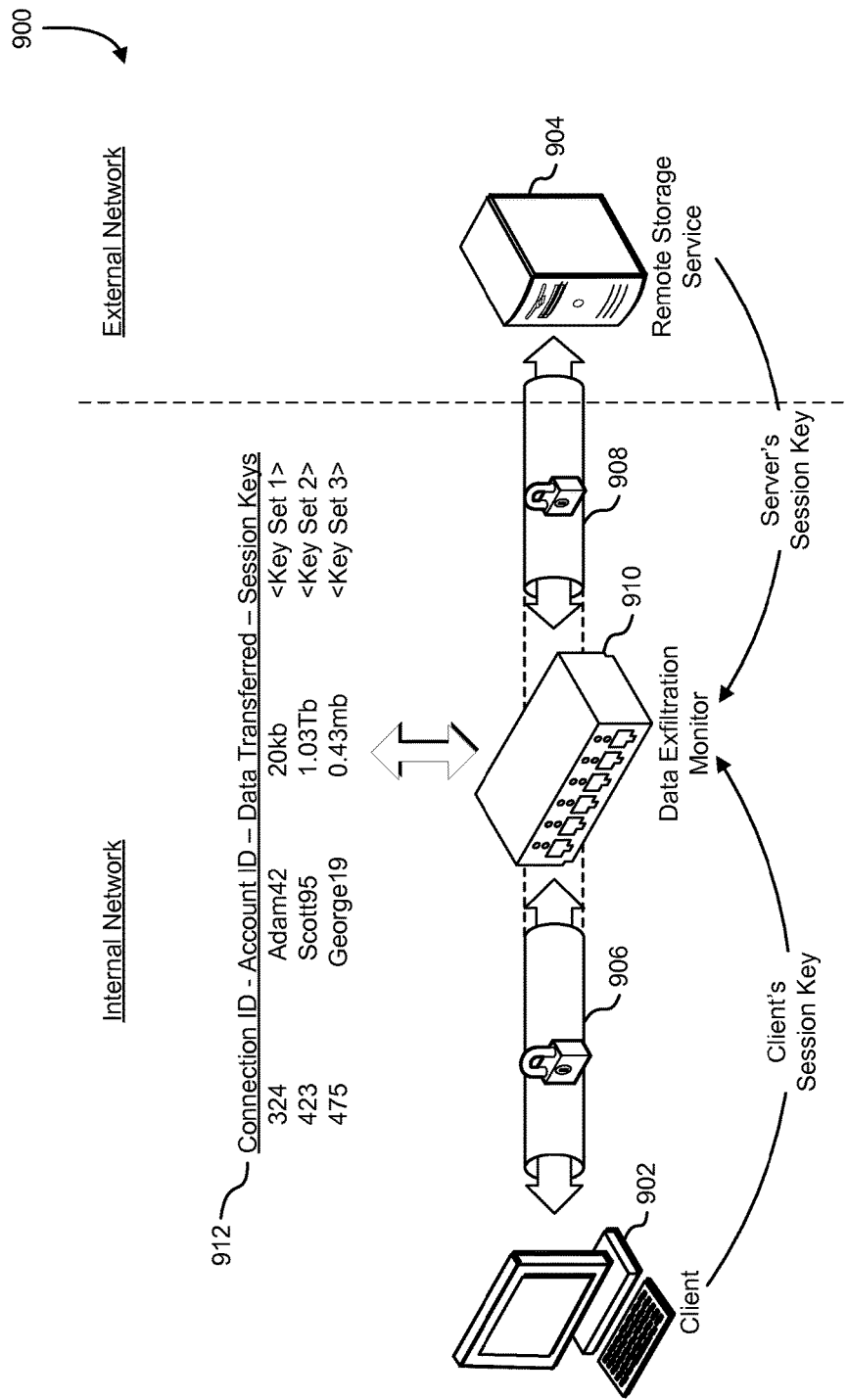
FIG. 9 shows an illustrative example of a data exfiltration monitor that acquires session keys for connections that access a remote storage service, in accordance with an embodiment.

FIG. 9 shows an illustrative example of a data exfiltration monitor that acquires session keys for connections that access a remote storage service, in accordance with an embodiment. A diagram 900 shows a system with a client 902 and a remote storage service 904 that exchange data over a secure connection such as TLS. The secure connection is divided into two parts, a first connection part 906 and a second connection part 908, by a data exfiltration monitor 910.

The data exfiltration monitor 910 can be provided with cryptographic keys that enable the data exfiltration monitor 910 to decrypt and inspect communications between the client 902 and the remote storage service 904. In one implementation, the client 902 sends the client's TLS session keys to the data exfiltration monitor 910 as part of an extended TLS handshake, and the remote storage service 904 provides the remote storage service's TLS session keys as part of the server's extended "Server hello" message. In another implementation, the client 902 sends the client's TLS session keys to the data exfiltration monitor 910 over a separate connection to the data exfiltration monitor 910 after the TLS handshake is complete, and the remote storage service 904 sends the remote storage service's TLS session keys to the data exfiltration monitor 910 over a separate connection to the data exfiltration monitor 910 after the TLS handshake is complete. In yet another implementation, the client 902 and the remote storage service 904 provide their TLS session keys to a database in the internal network that is accessible to the data exfiltration monitor 910. The cryptographic keys can be transmitted to the data exfiltration monitor 910 over a secure encrypted channel established to the data exfiltration monitor 910, or if the cryptographic keys are included as part of an extended TLS handshake, the cryptographic keys can be encrypted using a cryptographic key accessible to the data exfiltration monitor 910.

The data exfiltration monitor 910 may, by using the provided cryptographic keys of the client 902 and/or the remote storage service 904, decrypt and inspect the information exchanged between the client 902 and the remote storage service 904. The data exfiltration monitor 910 maintains a table of connection information 912 that records the cryptographic keys associated with each connection. In some implementations, the data exfiltration monitor 910 identifies account information exchanged between the client 902 and the remote storage service 904 over a particular connection, and associates the identified account with the particular connection. In another implementation, the data exfiltration monitor 910 identifies account information exchanged between the client 902 and the remote storage service 904, and associates the identified account with the data transferred and/or the particular amounts of data transferred. In some implementations, the data exfiltration monitor 910 receives cryptographic keys from the client 902, and not from the remote storage service 904. In other implementations, the data exfiltration monitor 910 receives cryptographic keys of the remote storage service 904, and not from the client 902.

Using the cryptographic keys provided by the client 902 and the remote storage service 904, the data exfiltration monitor 910 may control and enforce a number of data exfiltration policies. The data exfiltration monitor 910 can monitor and enforce policies based at least in part on associating an account with a secure connection that is described above. In some embodiments, the data exfiltration monitor 910 can restrict exfiltration of particular content stored on the internal network.

Figure 10:
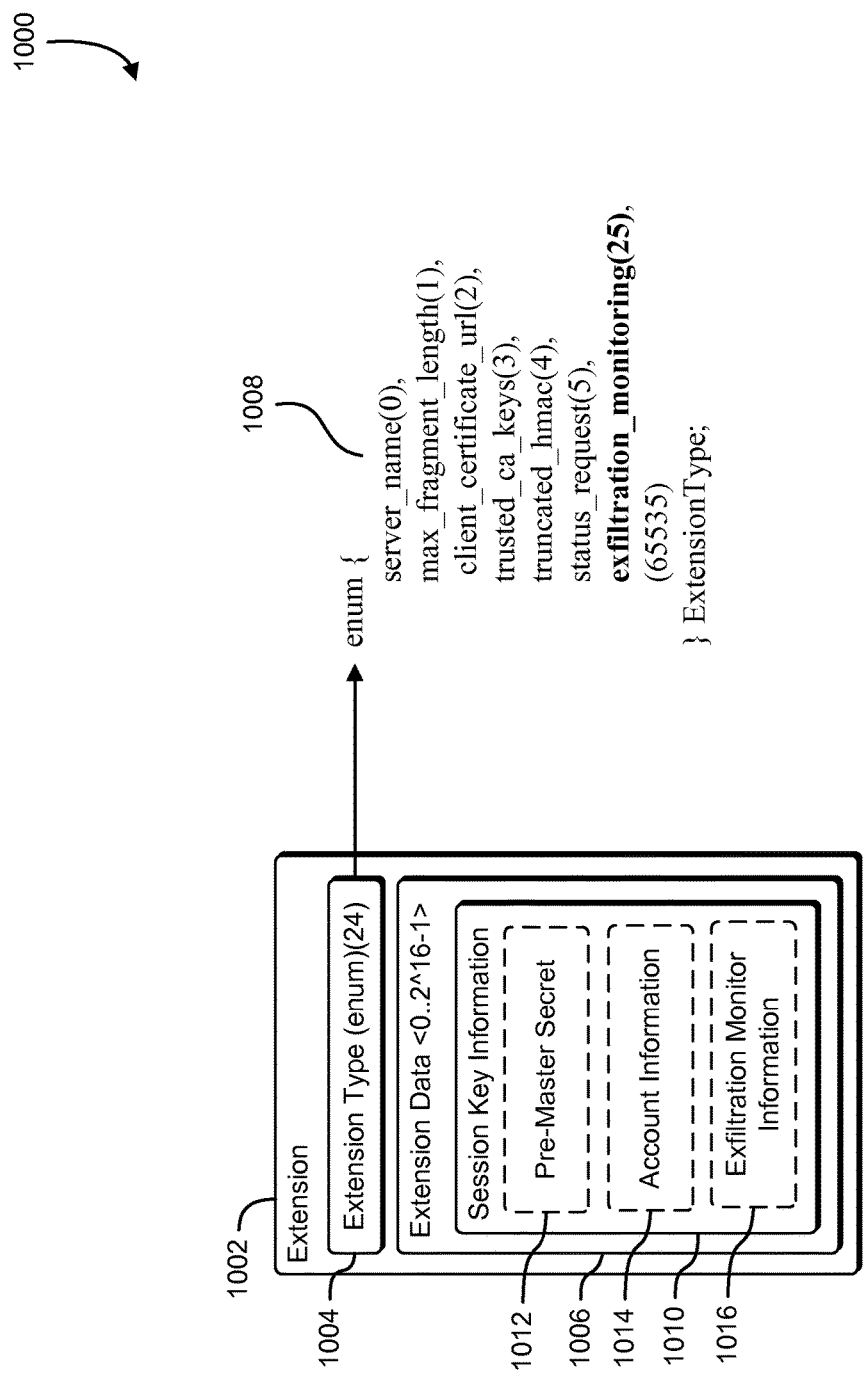
FIG. 10 shows an illustrative example of an extension record that includes a TLS session key, in accordance with an embodiment.

FIG. 10 shows an illustrative example of an extension record that includes a TLS session key, in accordance with an embodiment. A diagram 1000 shows a structure of a TLS extension record 1002 that includes session key information. The TLS extension record 1002 can be included as part of a modified TLS handshake. The TLS extension record 1002 includes an extension type 1004, and extension data 1006. The extension type 1004 is an enumeration that specifies the type of the extension. An example definition showing various types of extensions is shown in a code fragment 1008. The code fragment 1008 defines seven types of extensions: a server name extension, a max fragment length extension, a client certificate URL extension, a trusted CA keys extension, a truncated HMAC extension, a status request extension, and an exfiltration monitoring extension. Additional types of extensions can be defined by modifying the provided code fragment 1008. Session key information 1010 is provided in the extension data 1006. The session key information 1010 may include a pre-master secret 1012, account information 1014 and exfiltration monitor information 1016. In some implementations, some or all of the session key information 1010 is encrypted using a cryptographic key accessible to the data exfiltration monitor. The pre-master secret 1012 is information that can be used to derive the session key used by the TLS connection. The account information 1014, if present, can be used by the data exfiltration monitor to associate the connection with the particular service account as described above. The exfiltration monitor information 1016 is provided by the client, and can be used by the server to establish a connection from the server to the data exfiltration monitor. In some implementations, the exfiltration monitor information 1016 includes a public cryptographic key of a public-private graphic key pair that is known to the data exfiltration monitor. In some implementations, the exfiltration monitor information 1016 includes a network address of the exfiltration monitor.

In a TLS-based implementation, the TLS extension record 1002 is transmitted in the extended "Client hello" message that is sent to the remote service. When the server receives the extended "Client hello" message, the server can respond with an extended "Server hello" message that also includes a second TLS extension record. The session key information 1010 can be included in the extended "Client hello" message, the extended "Server hello" message, or both extended "Client hello" and extended "Server hello" messages.

Figure 11:
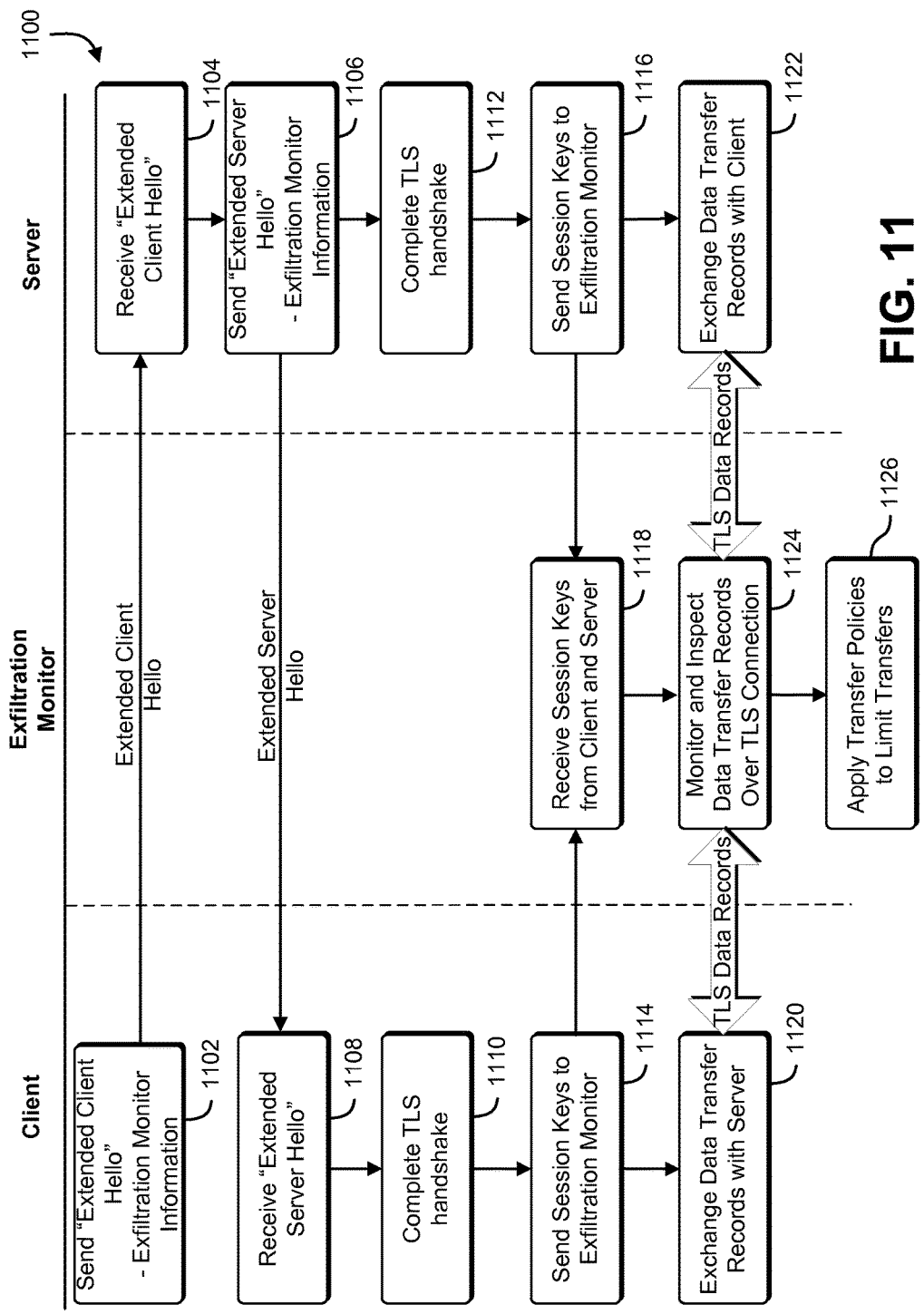
FIG. 11 shows an illustrative example of a process that, when performed by a client, a server, and an exfiltration monitor, monitors data exfiltration using a session key provided by the client, in accordance with an embodiment.

FIG. 11 shows an illustrative example of a process that, when performed by a client, a server, and an exfiltration monitor, monitors data exfiltration using a session key provided by the client, in accordance with an embodiment. A swim diagram 1100 illustrates a process that establishes a secure session with an extended TLS handshake. The extended TLS handshake includes exfiltration information that can be provided in the extended "Client hello" and extended "Server hello" messages. The exfiltration monitor extracts the exfiltration information provided in the extended TLS handshake and uses the information to acquire cryptographic session keys for the connection. At block 1102, the client sends an extended "Client hello" message to the server. The extended "Client hello" message includes an exfiltration information extension. An extension data field can contain information related to the exfiltration monitor such as the network address of the exfiltration monitor, and cryptographic keys for decrypting encrypted data exchanged between the client and server. At block 1104, the server receives the extended "Client hello" message, with the exfiltration information extension. In some implementations, at block 1106, the server responds to the client with an extended "Server hello" message that includes an exfiltration information extension. At block 1108, the client receives the extended "Server hello" message, which includes the server's digital certificate. The server's digital certificate may be validated by the client to confirm the server's identity. At block 1110, the client completes the TLS handshake by in part sending a change cipher spec message and a "Client finished" message to the server. At block 1112, the server completes the TLS handshake by sending a change cipher spec message and a "Server finished" message to the client.

At block 1114, the client sends session keys to the exfiltration monitor, and at block 1116 the server sends session keys to the exfiltration monitor. In some implementations, session keys may be provided by either the client or the server or both the client and the server. At block 1118, the exfiltration monitor receives session keys from the client and the server that allow the exfiltration monitor to decrypt transmissions between the client and the server. At block 1120 and 1122, the client and the server exchange information over an encrypted TLS connection. The exfiltration monitor monitors 1124 communications and, using the session keys provided by the client and or the server, decrypts the transmissions and inspects the contents of the data records. At block 1126, the exfiltration monitor applies a set of exfiltration policies. The exfiltration policies can restrict the amount of data transferred from the internal network to service accounts other than those used for legitimate business purposes. In some implementations, the exfiltration policies limit the particular data that can be transmitted outside the internal network.

Figure 12:
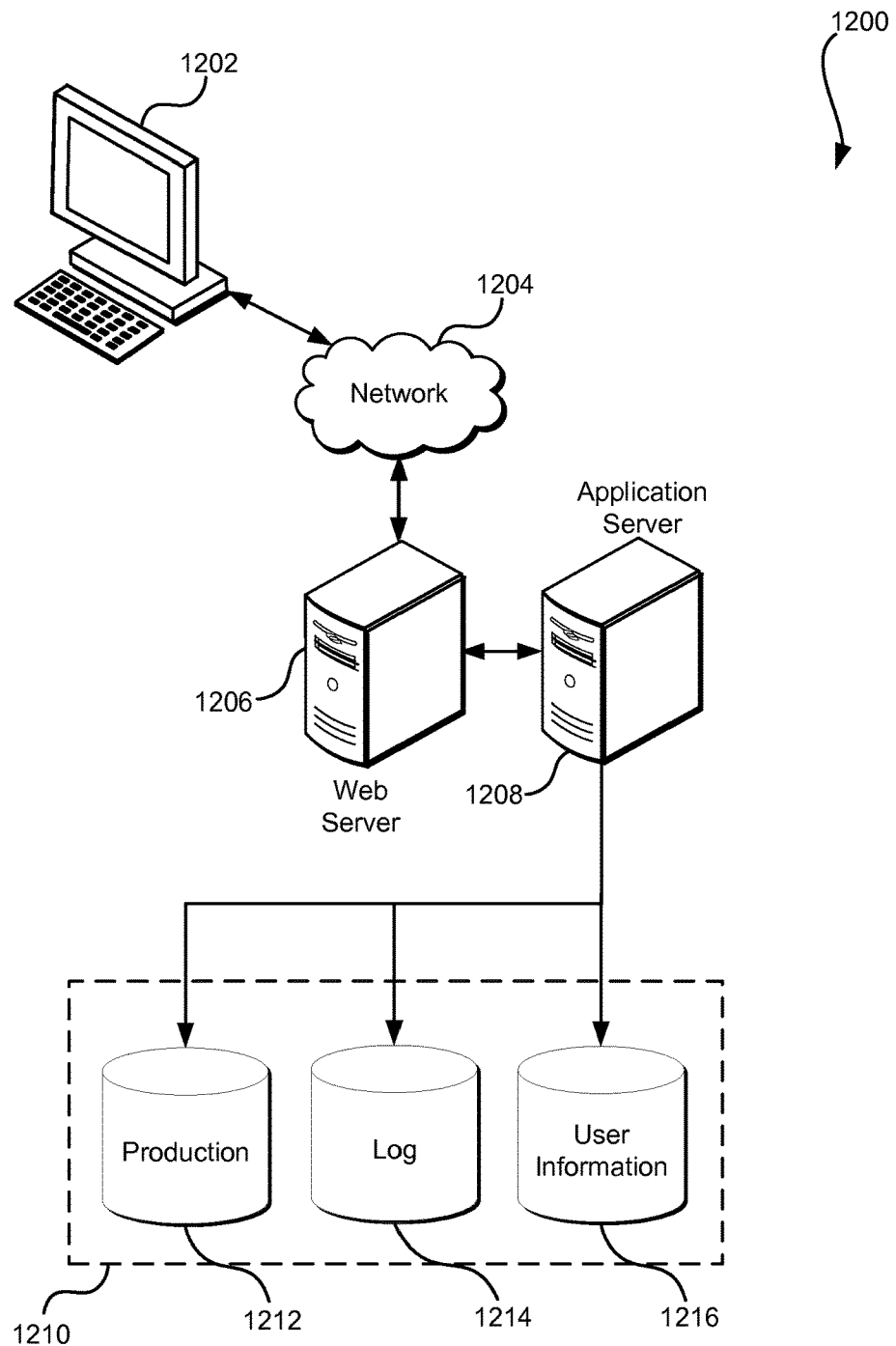
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle, Microsoft®, Sybase, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adapatable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

In the preceding and following description, various examples are described. For purposes of explanation, specific configurations and details are set forth in order to provide a thorough understanding of the examples, but the examples may be practiced without the specific details. In some places, well-known features may be omitted or simplified in order not to obscure the example being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
monitoring, with an exfiltration-monitoring device, a Transport Layer Security ("TLS") connection between a client on an internal network and a remote service, the monitoring comprising:
acquiring account information from data contained in a TLS extension transmitted from the client to the remote service as part of a TLS handshake that establishes the TLS connection, the account information comprising an identity of an account associated with the TLS connection;
recording, in association with the MS connection, an amount of data transmitted over the MS connection from the client to the remote service;
determining that the TLS connection is potentially being used for an unauthorized transfer of data from the internal network to the remote service based at least in part on the amount of data transmitted, and the identity of the account associated with the TLS connection not being associated with the client; and
limiting the transfer of data over the TLS connection.

2. The computer-implemented method of claim 1, wherein the account information is included in a TLS extended "Client hello" message transmitted by the client.

3. The computer-implemented method of claim 1, wherein the exfiltration-monitoring device is a network router positioned between the client and the remote service.

4. The computer-implemented method of claim 1, wherein limiting the transfer of data includes terminating the TLS connection.

5. A system, comprising one or more processors coupled to a non-transitory computer readable storage medium containing instructions that, as a result of execution by the one or more processors, cause the system to:
determine a service account associated with a cryptographically protected communications session, based at least in part on account information in a message that includes extension data received as part of performing a handshake protocol, the handshake protocol used in establishment of the cryptographically protected communications session between a client and the server;
record, in association with the determined service account, information about messages passed over the cryptographically protected communications session, the information including an amount of data transmitted in association with the determined service account;
determine, based at least in part on the recorded amount of data transmitted and that the service account associated with the cryptographically protected communications session is not associated with the client, a violation of a data exfiltration policy; and
perform an operation to prevent the violation of the data exfiltration policy.

6. The computer-implemented method of claim 1, wherein determining that the TLS connection is potentially being used for an unauthorized transfer of data from the internal network to the remote service is further based at least in part on the amount of data transmitted exceeding a quota.

7. The system of claim 5, wherein the cryptographically protected communications session is a TLS session.

8. The system of claim 7, wherein the message used in establishment of a cryptographically protected communications session is a TLS "Client hello" extension that includes information about the service account.

9. The system of claim 8, wherein the information included in the TLS "Client Hello" extension is encrypted using a cryptographic key that is accessible to the system.

10. The system of claim 5, wherein the message used in establishment of a cryptographically protected communications session includes an account II) of the service account.

11. The system of claim 5, wherein the message is encrypted using a public key of a public-private key pair and a private key of the public-private key pair is accessible to the system.

12. The system of claim 5, wherein the operation to prevent violation of the data exfiltration policy includes terminating the cryptographically protected communications session.

13. The system of claim 5, wherein the instructions, as a result of execution by the one or more processors, further cause the system to send a notification to the server that indicates that an unauthorized data transfer to the server has occurred via the cryptographically protected communications session.

14. A non-transitory computer-readable storage medium comprising executable instructions that, as a result of execution by one or more processors of a computer system, cause the computer system to at least:
monitor an encrypted network connection between a client and a remote service;
identify, based at least in part on account information included with a message comprising account identification extension data sent as part of a handshake protocol used to establish the encrypted network connection, a service account associated with the encrypted network connection;
record, in association with the service account, information about data transferred from the client to the remote service via the encrypted network connection, the information comprising an amount of data transmitted and indicating that the client is using a different service account than the service account associated with the encrypted network connection;
determine, based at least in part on the information, that the data transferred from the client to the remote service is unauthorized; and
perform an action limiting the data transferred.

15. The non-transitory computer-readable storage medium of claim 14, wherein the instructions further comprise instructions that, as a result of execution by the one or more processors, cause the computer system to receive an indication that the client is using a different service account than the service account associated with the encrypted network connection.

16. The non-transitory computer-readable storage medium of claim 14, wherein the instructions further comprise instructions that, as a result of execution by the one or more processors, cause the computer system to:
receive information from the remote service that indicates a second amount of data stored using the service account;
determine that the amount of data does not match the second amount of data; and
determine that the encrypted network connection is not associated with the service account.

17. The non-transitory computer-readable storage medium of claim 16, wherein the instructions further comprise instructions that, as a result of execution by the one or more processors, cause the computer system to, as a result of determining that the encrypted network connection is not associated with the service account, disable the encrypted network connection.

18. The non-transitory computer-readable storage medium of claim 14, wherein the instructions further comprise instructions that, as a result of execution by the one or more processors, cause the computer system to determine, based at least in part on the information about data transferred, that an amount of transferred data exceeds a transfer limit, the transfer limit is based at least in part on a data exfiltration policy and the identified service account.

19. The non-transitory computer-readable storage medium of claim 18, wherein the instructions further comprise instructions that, as a result of execution by the one or more processors, cause the computer system to, as a result of determining that the amount of data exceeds a transfer limit, transmit an alert to the remote service that indicates that the encrypted network connection has been used for an unauthorized transmission of data to the remote service.

20. The non-transitory computer-readable storage medium of claim 14, wherein the instructions further comprise instructions that as a result of execution by the one or more processors, cause the computer system to receive, from the client and the remote service, a number of cryptographic keys usable to decrypt data transmitted via the encrypted network connection.

21. The non-transitory computer-readable storage medium of claim 20, wherein:
the encrypted network connection is a TLS connection;
the cryptographic keys are session keys associated with the TLS connection; and
the instructions further comprise instructions that, as a result of execution by the one or more processors, cause the computer system to receive a TLS extension record that includes a network address of the computer system and a public cryptographic key of a public-private cryptographic key pair that is accessible to the computer system.

22. A non-transitory computer-readable storage medium comprising executable instructions that, as a result of execution by one or more processors of a computer system, cause the computer system to at least:
establish an encrypted network connection to a service;
identify a service account associated with the service;
transmit, in a format readable by an exfiltration monitor, as part of a handshake protocol used to establish the encrypted network connection, information contained in an extension to the handshake protocol that comprises an identity of the service account;
determine, based at least in part on the information transmitted as part of the handshake protocol, that the identity of the service account is invalid; and
terminate the encrypted network connection to the service.

23. The non-transitory computer-readable storage medium of claim 22, wherein the instructions further comprise instructions that, as a result of execution by the one or more processors, cause the computer system to:
authenticate with the service using the service account; and
interact with the service in accordance with being authorized by the service account.

24. The non-transitory computer-readable storage medium of claim 22, wherein:
the encrypted network connection is a TLS connection; and
the service account is identified by transmitting an extended TLS "hello" message that includes an account ID.

25. The non-transitory computer-readable storage medium of claim 22, wherein the information that identifies the service account is encrypted using a cryptographic key accessible to the exfiltration monitor.

26. The non-transitory computer-readable storage medium of claim 22, wherein the information that identifies the service account includes a cryptographic authenticator.

27. The non-transitory computer-readable storage medium of claim 26, wherein the cryptographic authenticator is a digital signature generated using a private key of a public-private key pair.

\* \* \* \* \*